(12) United States Patent
Ji et al.

(10) Patent No.: US 9,438,884 B2
(45) Date of Patent: Sep. 6, 2016

(54) METHOD FOR PROCESSING AN IMAGE AND ELECTRONIC DEVICE FOR SAME

(75) Inventors: Salkmann Ji, Seoul (KR); Kyuyeol Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 184 days.

(21) Appl. No.: 14/239,125

(22) PCT Filed: Aug. 17, 2011

(86) PCT No.: PCT/KR2011/006038
§ 371 (c)(1),
(2), (4) Date: Feb. 14, 2014

(87) PCT Pub. No.: WO2013/024920
PCT Pub. Date: Feb. 21, 2013

(65) Prior Publication Data
US 2014/0152775 A1    Jun. 5, 2014

(51) Int. Cl.
*H04N 13/02* (2006.01)
(52) U.S. Cl.
CPC ........ *H04N 13/0203* (2013.01); *H04N 13/021* (2013.01); *H04N 13/0207* (2013.01); *H04N 13/0217* (2013.01); *H04N 13/0296* (2013.01)
(58) Field of Classification Search
USPC ......................................................... 348/46
See application file for complete search history.

(56) References Cited

U.S. PATENT DOCUMENTS

2010/0097707 A1* 4/2010 Seo ...................... G02B 15/173
                                                        359/672
2012/0327195 A1* 12/2012 Cheng ................ H04N 5/23212
                                                        348/47

FOREIGN PATENT DOCUMENTS

JP          2006-217474 A     8/2006
KR    10-2008-0019686 A       3/2008

OTHER PUBLICATIONS

International Search Report dated Apr. 4, 2012 issued in Application No. PCT/KR2011/006038.

* cited by examiner

*Primary Examiner* — Leron Beck
(74) *Attorney, Agent, or Firm* — KED & Associates, LLP

(57) ABSTRACT

In one embodiment of the present invention, a method for processing an image in an electronic device having a plurality of optical lenses is provided. The method for processing an image may comprise the steps of: obtaining a first image according to a first mode by means of a first optical lens; obtaining a second image simultaneously with or after the obtaining of the first image according to a second mode by means of a second optical lens; and processing and storing the first image obtained according to the first mode and the second image obtained according to the second mode. Here, the first and second modes are different from each other and may vary.

13 Claims, 15 Drawing Sheets

(a)

(b)

FIG. 1
(a)
(b)
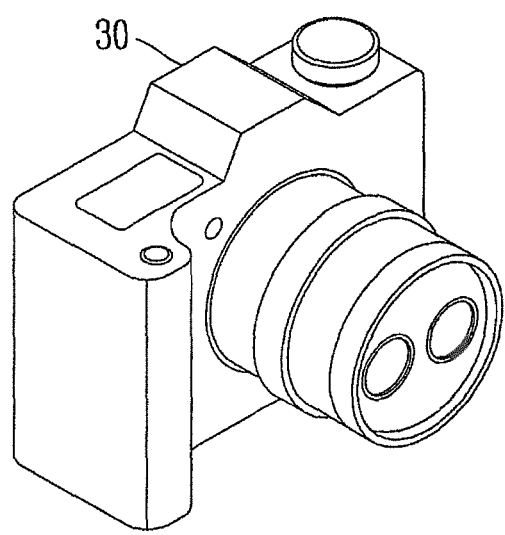

FIG. 2
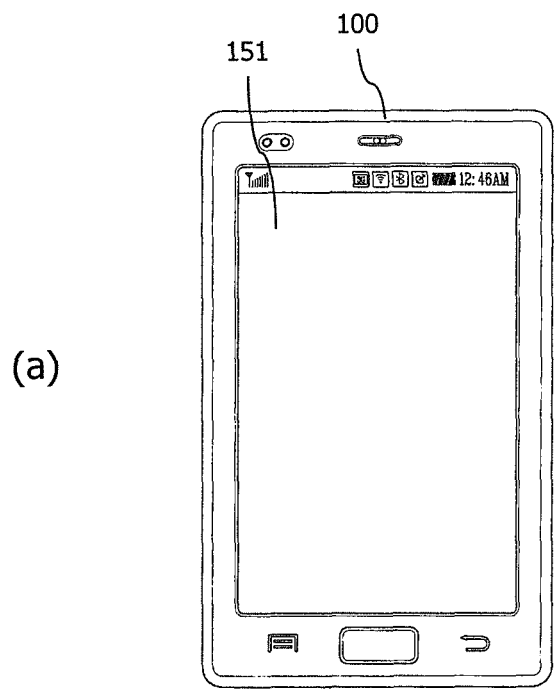
(a)
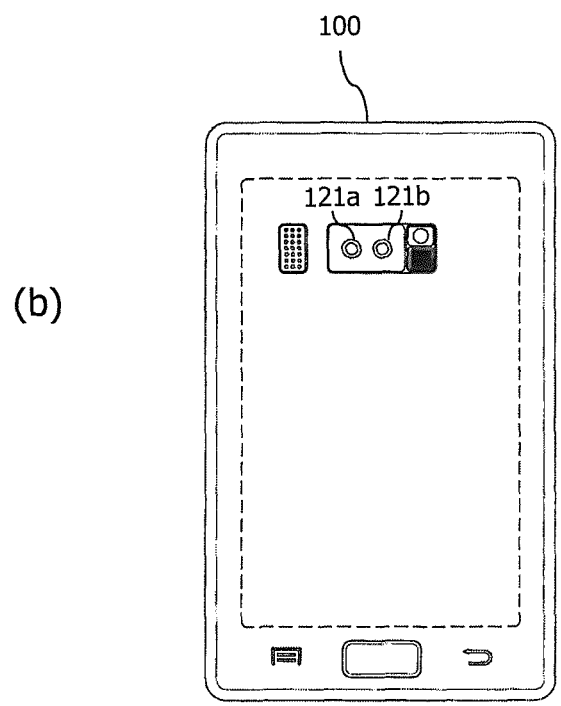
(b)

FIG. 6
(a) 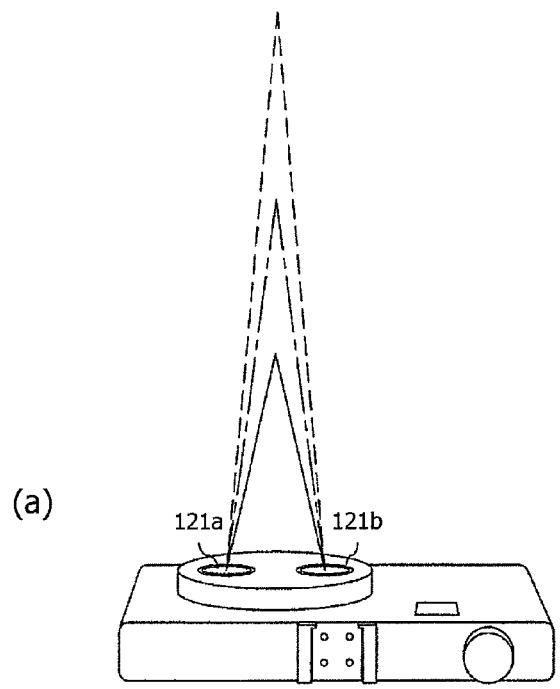
(b) 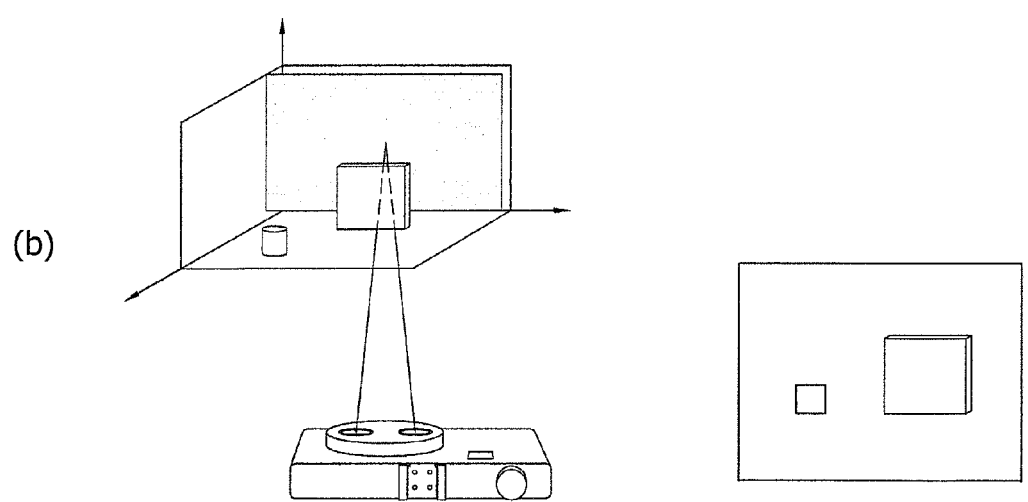

FIG. 9
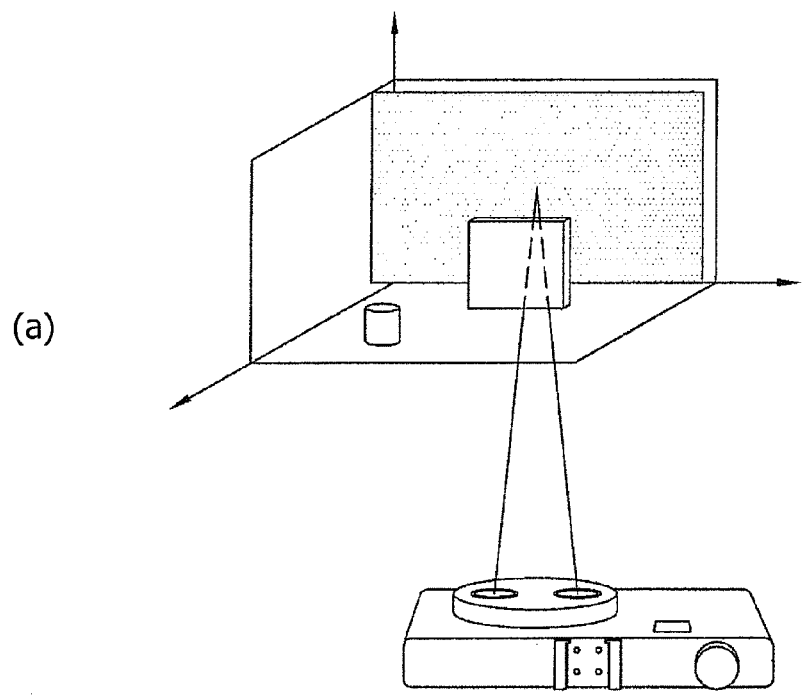
(a)
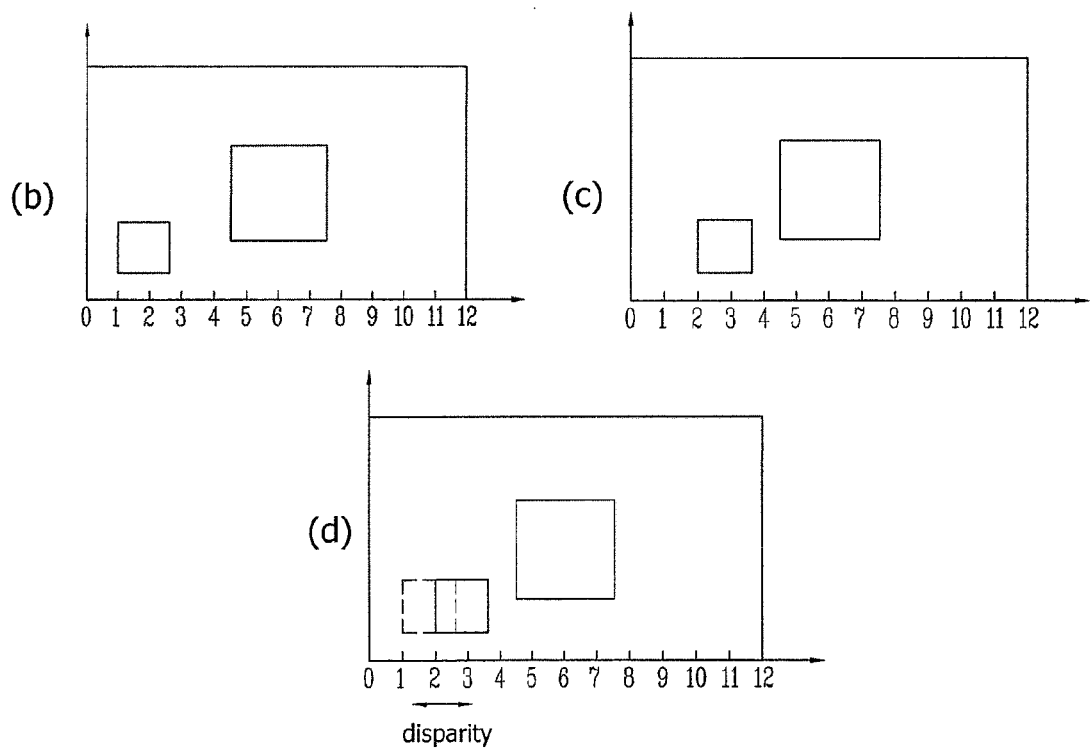
(b)
(c)
(d)
disparity

METHOD FOR PROCESSING AN IMAGE AND ELECTRONIC DEVICE FOR SAME

CROSS-REFERENCE TO RELATED PATENT APPLICATION

This application is a U.S. National Stage Application under 35 U.S.C. §371 of PCT Application No. PCT/KR2011/006038, filed Aug. 17, 2011.

TECHNICAL FIELD

The present disclosure relates to a method for processing an image.

BACKGROUND ART

Recently, in line with an increase in interest in stereoscopic video services, devices providing stereoscopic images have been developed. A stereoscopic scheme is one of schemes of implementing a stereoscopic image.

A basic principle of the stereoscopic scheme is that a left eye image and a right eye image, which are arranged to be orthogonal, are separately input to a left eye and a right eye of a human being and the images input to the left and right eyes of the human being are combined in the human being's brain to thus generate a stereoscopic image. Here, arrangement of the images to be orthogonal to each other refers to that the images do not interfere with each other.

FIG. 1

FIG. 1 is a view illustrating a stereoscopic image display device and a stereoscopic image camera.

As can be seen with reference to FIG. 1(a), a stereoscopic image display device is displayed.

A method for implementing a stereoscopic image display device may be divided into a glass scheme and a glassless scheme.

The glass scheme includes a polarization scheme, a time-sequential scheme, and a spectral scheme.

First, the polarization scheme is separating respective images by using polarizing filters. Namely, by applying orthogonal polarizing filters to the image for the left eye and the image for the left eye, different images filtered by the polarizing filters are input to the left and right visual fields.

The time-sequential scheme is a method in which left and right images are alternately displayed and active glasses a user is wearing is synchronized with the alternately displayed images to thus separate each image. Namely, when images are alternately displayed, a shutter of the active glasses synchronized therewith open only a visual field to which the corresponding image is to be input, while blocking the other visual field, thus allowing the left and right images to be separately input.

The spectral scheme is a method of projecting left and right images through spectrum filters having spectrum bands in which RGB spectrums do not overlap with each other. With respect to the projected left and right images, a user wear passive glasses that include the spectral filters allowing only spectrum regions set for left and right images to thus separately receive the left and right images.

Meanwhile, the glassless scheme includes a multi-view glassless scheme. The multi-view glassless scheme may include a parallax barrier scheme and a lenticular lens scheme.

In the parallax barrier scheme, a barrier (film) is coated on a display. The barrier (film) includes vertical lines, and slits exist between the vertical lines. Tee slits create a disparity between left and right eyes.

The lenticular scheme is a scheme of arranging small lens on a display to allow an image to be refracted by the small lens so as to be visible differently to left and right eyes of the user.

Meanwhile, a 3D or stereoscopic display apparatus has a limitation as prevalence of 3D content or stereoscopic content is not brisk, FIG. 1(b) illustrates a camera capable of producing a stereoscopic image.

As illustrated in FIG. 1(b), the camera capable of producing a 3D or a stereoscopic image may capture images by means of two camera lens by using a stereoscopic scheme to generate a stereoscopic image.

3D cameras have been actively developed and relevant products have been released.

However, general users are not accustomed to produce a 3D or a stereoscopic image. In particular, users are unfamiliar to 3D or stereoscopic images, so not many users want to purchase a 3D or stereoscopic camera.

Also, until when all the display devices of general users are changed into 3D display devices, displays allowing for viewing of captured 3D or stereoscopic image are limited, so generality is degraded.

In addition, it is difficult to reproduce a 3D or stereoscopic image by a method such as printing, or the like, and thus, utilization of a 3D or stereoscopic image is very low.

DISCLOSURE

Technical Problem

Therefore, an object of the present disclosure is to provide a method for solving the aforementioned problems.

In addition, another object of the present disclosure is to provide a method for effectively capturing a general image, namely, a 2D image, by using a 3D or stereoscopic camera having a plurality of lenses.

Also, another object of the present disclosure is to provide a method for obtaining a quality image that may be obtained only through a high performance optical lens, by using a 3D or stereoscopic camera including a plurality of lenses.

Technical Solution

According to an aspect of the present disclosure, there is provided a method for processing an image in an electronic device having a plurality of optical lenses. The method for processing an image may include: obtaining a first image through a first optical lens in a first mode; obtaining a second image through a second optical lens in a second mode obtaining a second image simultaneously with or subsequently after the obtaining of the first image; and processing the first image obtained in the first mode and the second image obtained in the second mode and storing the same, wherein the first mode and the second mode are different and changeable.

The method for processing an image may further include: adjusting a convergence point between the first optical lens and the second optical lens to a main subject in obtaining the first image and the second image.

In obtaining the first image and the second image, the first image and the second image may be obtained after a disparity value between a main subject appearing in the first image and a main subject appearing in the second image is minimized. The first image and the second image may be related to the same object or scene.

The first mode may be a mode in which the main subject is focused and the second mode may be a mode in which the main subject is not focused, the first mode may be a mode in which an image is captured to have a first color tone and the second mode may be a mode in which an image is captured to have a second color tone, the first mode may be a mode in which an image is captured by using a first effect and the second mode may be a mode in which an image is captured by using a second effect, the first mode may be a mode in which an image is captured with a first aperture value and the second mode may be a mode in which an image is captured with a second aperture value, the first mode may be a mode in which an image is captured with a first shutter speed value and the second mode may be a mode in which an image is captured with a second shutter speed value, and the first mode may be a mode in which video is captured and the second mode may be a mode in which a still image is captured.

When the first image is an image in which the main subject is focused according to the first mode and the second image is an image in which the main subject is not focused according to the second mode, the processing may be synthesizing the first image with the second image in order to generate an image in which regions, excluding the main subject, are out-focused.

During the processing, a disparity map between the first image and the second image may be obtained. During the processing, a region in which a disparity is the smallest may be obtained from the first image, a region in which a disparity is the largest may be obtained from the second image, and a region in which a disparity is median may be obtained by synthesizing the first image and the second image according to the disparity map. The processor may synthesize the obtained regions into a single image, and store the same.

When the first image is an image in which a color of a person is emphasized according to the first mode and the second image is an image in which a color of a background is emphasized according to the second mode, the processing may be synthesizing the first image with the second image to generate an image in which both the color of the person and the color of the background are emphasized.

In the storing, at least one of the first image, the second image, the image obtained by synthesizing the first and second images, and descriptors with respect to any one of the first image, the second image, and the synthesized image, may be stored in a single file.

According to another aspect of the present disclosure, there is provided an electronic device having a plurality of optical lenses. The electronic device may include: a first optical lens; a second optical lens; and a processor configured to control the first optical lens and the second optical lens to obtain a first image in a first mode through the first optical lens and obtain a second image in a second mode through the second optical lens, process the first image and the second image, and store the same.

Advantageous Effects

According to embodiments of the present disclosure, the aforementioned problems of the related art are solved.

In detail, a general image, namely, a 2D image, may be more effectively captured by using a 3D or stereoscopic camera including a plurality of lenses.

Also, a quality image that may be obtained only through a high performance optical lens may be obtained by using the 3D or stereoscopic camera having a plurality of lenses.

DESCRIPTION OF DRAWINGS

FIG. 1 includes views illustrating a stereoscopic display device and a stereoscopic camera.

FIG. 2 includes vies the exterior of an electronic device according to an exemplary embodiment of the present disclosure.

FIG. 6 includes views illustrating an example of adjusting a convergence point illustrated in FIG. 5.

FIG. 9 includes views illustrating disparity included in the process illustrated in FIG. 5.

BEST MODES

Figure 3:
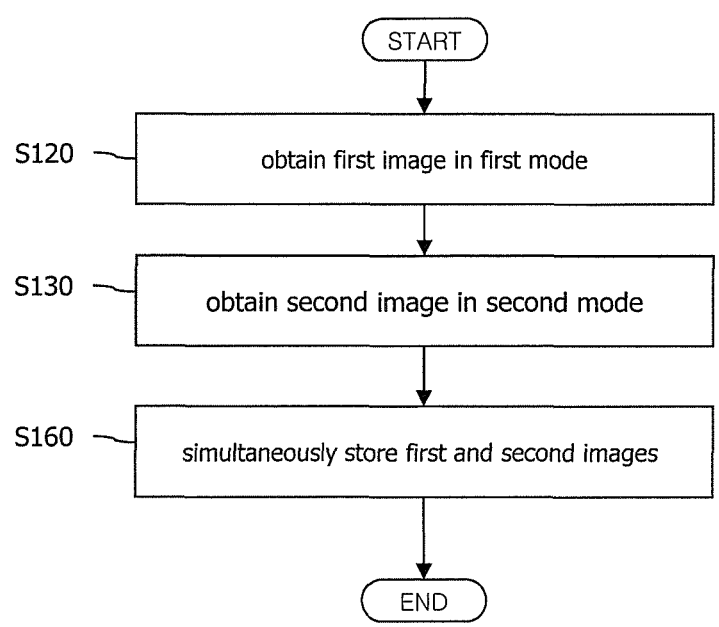
FIG. 3 is a flow chart illustrating an image processing process according to an exemplary embodiment of the present disclosure.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present disclosure, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

In the following description, usage of suffixes such as 'module', 'part' or 'unit' used for referring to elements is given merely to facilitate explanation of the present disclosure, without having any significant meaning by itself.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The exemplary embodiments of the present disclosure will now be described with reference to the accompanying drawings, in which like numbers refer to like elements throughout and a repeated description will be omitted.

In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings. The technical idea of the present disclosure should be interpreted to embrace all such alterations, modifications, and variations in addition to the accompanying drawings.

FIG. 2

FIG. 2 illustrates the exterior of an electronic device.

As can be seen with reference to FIG. 2, a portable terminal is illustrated as an electronic device 100. The portable terminal 100 may be one of a camera, a mobile communication terminal, a multimedia player, and a tablet terminal. In detail, the portable terminal may be any one of a mobile terminal, a personal digital assistant (PDA), a smartphone, a portable multimedia player (PMP), a notebook computer, and a table PC.

However, the electronic device 100 may be a terminal that may not be portable, for example, Internet protocol television (IPTV) terminal, a television, a 3D television, a video player, a telematics terminal, and a navigation terminal to be installed in a vehicle.

The electronic device 100 may include a camera unit 121 and a display unit 151. In a case in which the electronic device 100 is a portable terminal, the display unit 151 may be installed in a front surface of the portable terminal, and the camera unit 121 may be installed in a rear surface of the portable terminal as illustrated in FIG. 2. Alternatively, the camera unit 121 may also be installed in the front surface of the portable terminal.

The camera unit 121 may include at least a pair of optical lenses 121a and 121b installed to be spaced apart from one another at a horizontal interval as illustrated. The camera unit 121 may also be called a stereo camera or a stereoscopic camera. Here, the fixed horizontal interface may be set in consideration of a distance between two eyes of a general person.

A method for effectively processing an image by using the electronic device 100 having the first and second optical lenses 121a and 121b will be described hereinafter.

Figure 4:
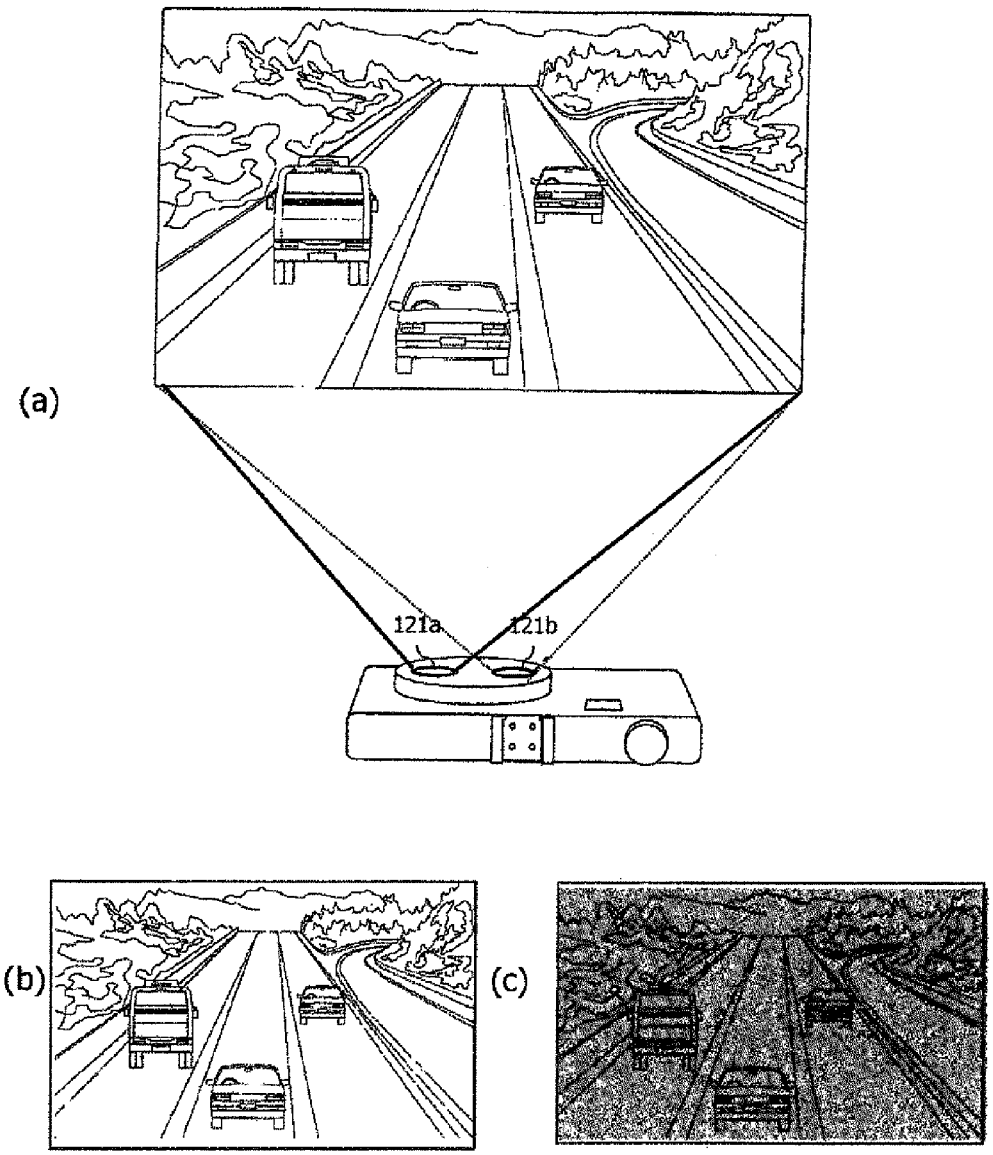
FIG. 4 includes views illustrating screens with respect to the image processing process illustrated in FIG. 3.

FIGS. 3 and 4

FIG. 3 is a flow chart illustrating an image processing process according to an exemplary embodiment of the present disclosure, and FIG. 4 includes views illustrating screens with respect to the image processing process illustrated in FIG. 3.

First, referring to FIG. 3, a first image is obtained in a first mode, and a second image is obtained in a second mode (S130).

Here, in a case in which the camera unit 121 includes the first optical lens 121a and the second optical lens 121b, the first optical lens 121a may be used to provide a preview image to the foregoing display unit 151, and the second optical lens 121b may be used to obtain the first image and the second image. Alternatively, the first optical lens 121a may be used to capture video, while the second optical lens 121b may be used to obtain the first image and the second image. Here, in order to obtain the first image and the second image through the second optical lens, a shutter of the second optical lens 121b may be opened and closed at a very fast speed.

However, when the camera unit 121 includes the first optical lens 121a and the second optical lens 121b, the first image may be obtained by the foregoing first optical lens 121a, while the second image may be obtained by the foregoing second optical lens 121b. Here, the first optical lens 121a and the second optical lens 121b may be simultaneously driven to obtain the first image and the second image, respectively, or after the first optical lens 121a obtains the first image, the second optical lens 121b may immediately obtain the second image. Namely, the first optical lens 121a and the second optical lens 121b may be used for a continuous shooting function (i.e., a function of capturing images successively). Thus, in the case in which the first optical lens 121a and the second optical lens 121b are implemented in this manner, a very fast continuous shooting function may be implemented.

The first optical lens 121a and the second optical lens 121b are arranged horizontally as illustrated in FIG. 4(a), the same scene may be obtained without a significant difference, and thus, the same scene may be captured through the first optical lens 121a in the first mode to obtain the first image, and the same scene may be captured through the second optical lens 121b in the second mode to obtain the second image.

The first mode and the second mode may be different and may be changed automatically or by a user.

Here, examples of images obtained in the first mode and the second mode, respectively, are illustrated in FIGS. 4(b) and 4(c). As illustrated in FIG. 4(b), the first mode may be a mode in which the scene is imaged brightly, and as illustrated in FIG. 4(c), the second mode may be a mode in which the scene is imaged darkly. To this end, an aperture of the first optical lens may be adjusted to have a low value according to the first mode, and an aperture of the second optical lens may be adjusted to have a high value. Alternatively, a shutter speed of the first optical lens may be reduced according to the first mode, and a shutter speed of the second optical lens may be adjusted to be faster according to the second mode.

Alternatively, the first mode may be a mode in which the scene is imaged such that a blue tone thereof is emphasized, and the second mode may be a mode in which the scene is imaged such that a red tone thereof is emphasized. Alternatively, the first mode may be a mode in which the scene is imaged by increasing a value of sharpness, and the second mode may be a mode in which the scene is imaged by reducing a value of sharpness. Alternatively, the first mode may be a mode for a white balance function under photovoltaic conditions, among white balance functions, and the second mode may be a mode for a white balance function under tungsten conditions, among the white balance functions. Alternatively, the first mode may be a mode in which international standards organization (ISO) sensitivity has a high value, and the second mode may be a mode in which ISO sensitivity has a low value.

Alternatively, the first mode may be a mode for capturing video, and the second mode may be a mode for capturing a still image.

FIGS. 5 through 9

Figure 5:
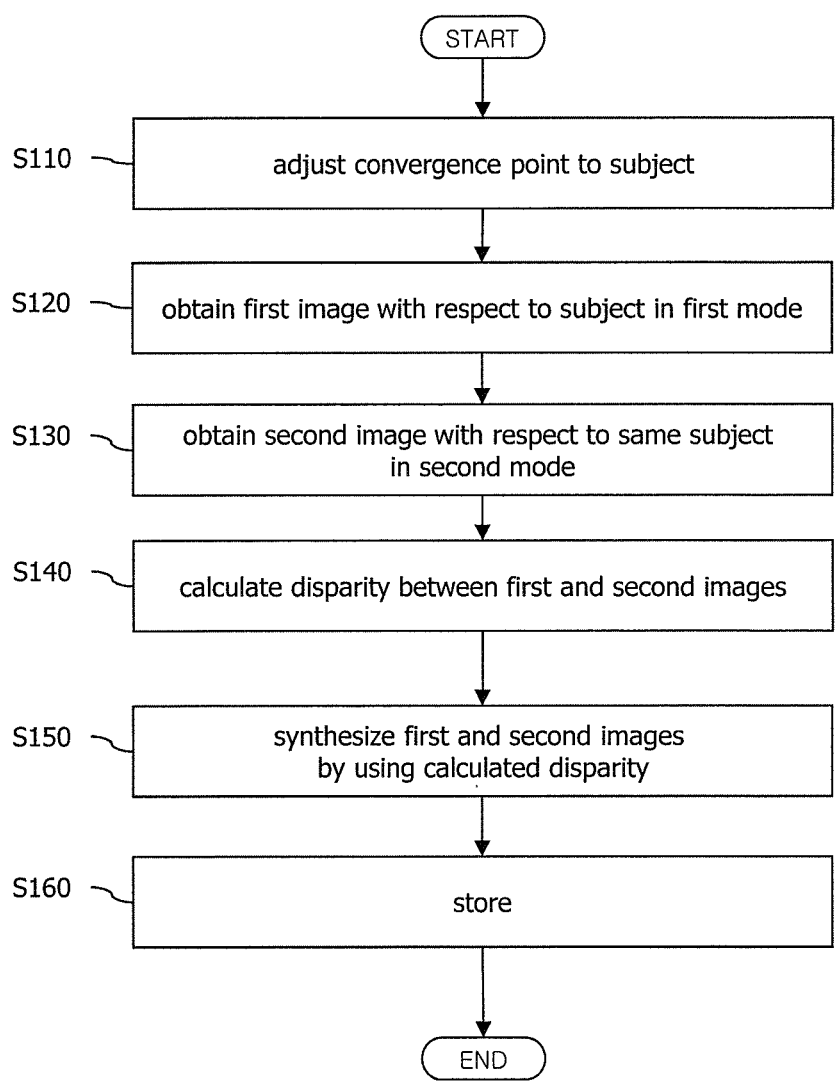
FIG. 5 is a flow chart illustrating a detailed process of the process illustrated in FIG. 3.
Figure 7:
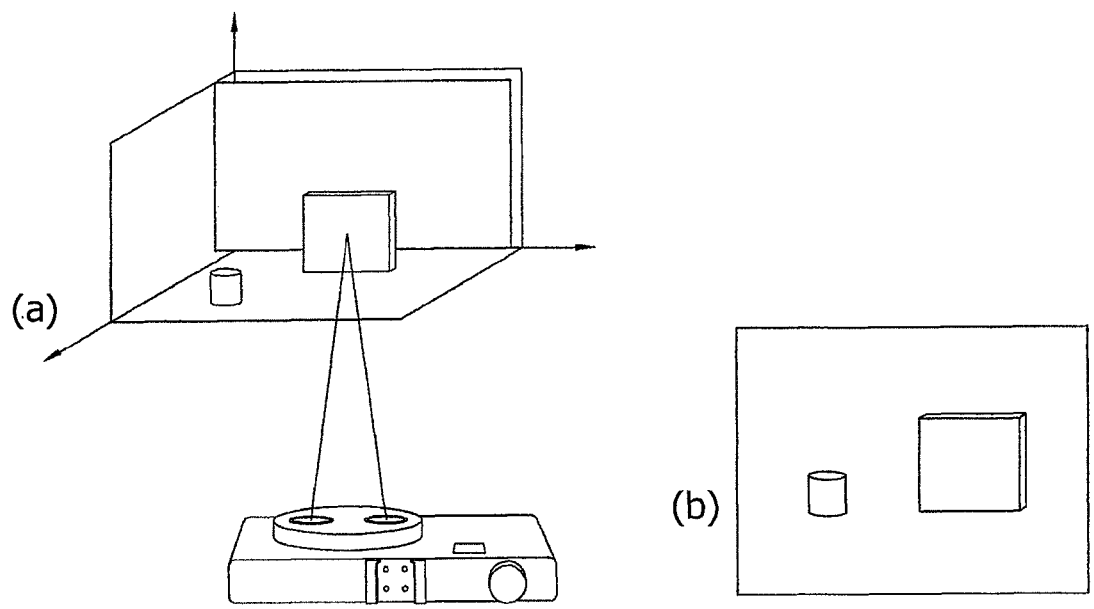
FIG. 7 includes views illustrating another example of adjusting a convergence point illustrated in FIG. 5.
Figure 8:
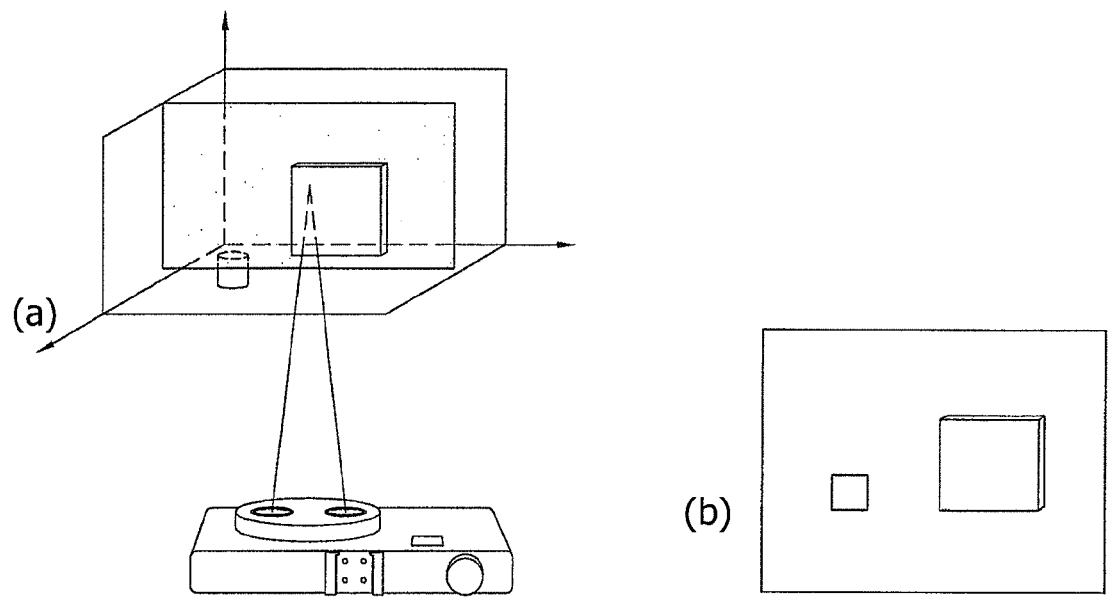
FIG. 8 includes views illustrating another example of adjusting a convergence point illustrated in FIG. 5.

FIG. 5 is a flow chart illustrating a detailed process of the process illustrated in FIG. 3. FIG. 6 includes views illustrating an example of adjusting a convergence point illustrated in FIG. 5. FIG. 7 includes views illustrating another example of adjusting a convergence point illustrated in FIG. 5. FIG. 8 includes views illustrating another example of adjusting a convergence point illustrated in FIG. 5. FIG. 9 includes views illustrating disparity included in the process illustrated in FIG. 5.

As can be seen with reference to FIG. 5, processes as described above with reference to FIG. 3 are specifically illustrated.

First, the electronic device 100 adjusts a convergence point to a subject (S110).

The convergence point refers to a point at which a three-dimensional (3D) effect (or a cubic effect) is 0. In detail, as can be seen from FIG. 6(a), points at which focal lengths of the first optical lens 121a and the second optical lens 121b are identical are convergence points. As illustrated in FIG. 6(a), a distance of a convergence point may be adjusted. Thus, when a main subject as a target to be imaged is adjusted to the convergence point, the main subject may be imaged without a 3D effect, namely, at a zero degree.

Referring to FIG. 6(b), it is assumed that there are a hexahedron and a cylinder and these are imaged. After a convergence point is adjusted to a point farther than the hexahedron, when the hexahedron and the cylinder are imaged, the hexahedron is expressed as being positioned in front of a background and the cylinder is expressed as being positioned in front of the hexahedron.

Meanwhile, referring to FIG. 7, after a convergence point is adjusted to the hexahedron, when the hexahedron and the cylinder are imaged, the hexahedron is expressed as 2D without a 3D effect while the cylinder may be expressed with a 3D effect as if it is positioned in front of the hexahedron.

In another example, referring to FIG. 8, after a convergence point is adjusted to the cylinder, when the hexahedron and the cylinder are imaged, the cylinder is expressed as 2D without a stereoscopic degree, while the hexahedron may be stereoscopically expressed as if it is positioned behind the cylinder.

In this manner, after a convergence point is adjusted to a subject, the subject is imaged in the first mode to obtain a first image (S120).

The same subject is imaged in the second mode to obtain a second image (S130).

The obtaining processes S120 and S130 may be performed simultaneously or sequentially. In the case in which the obtaining processes S120 and S130 are simultaneously performed, image capturing may be performed by driving the first optical lens 121a and the second optical lens 121b simultaneously. In the case of performing the obtaining processes S120 and S130 sequentially, the first image and the second image may be sequentially captured by using any one of the first optical lens 121a and the second optical lens 121b as described above. Alternatively, the first optical lens 121a and the second optical lens 121b may be sequentially driven to sequentially obtain the first and second images.

Here, as described above, the first mode may be a mode in which a scene is imaged brightly, and the second mode may be a mode in which a scene is imaged darkly. Alternatively, the first mode may be a mode in which the scene is imaged such that a blue tone thereof is emphasized, and the second mode may be a mode in which the scene is imaged such that a red tone thereof is emphasized. Alternatively, the first mode may be a mode in which the scene is imaged by increasing a value of sharpness, and the second mode may be a mode in which the scene is imaged by reducing a value of sharpness. Alternatively, the first mode may be a mode for a white balance function under photovoltaic conditions, among white balance functions, and the second mode may be a mode for a white balance function under tungsten conditions, among the white balance functions. Alternatively, the first mode may be a mode in which international standards organization (ISO) sensitivity has a high value, and the second mode may be a mode in which ISO sensitivity has a low value.

In this manner, when the obtaining of the first image and the second images is completed, the electronic device 100 calculates disparity between the first image and the second image (S140). Subsequently, the electronic device 100 may generate a disparity map on the basis of the disparity value.

A disparity between the first image and the second image refers to a difference between pixels when certain pixels of the first image are matched to certain pixels of the second image.

For example, as can be seen from FIG. 9(a), after a convergence point is adjusted to the hexahedron, when the hexahedron and the cylinder are imaged through the first optical lens, a first image as illustrated in FIG. 9(b) is obtained, and when the hexahedron and the cylinder are imaged through the second optical lens, a second image as illustrated in FIG. 9(c) is obtained, As can be seen from FIG. 9(b), in the first image, the cylinder exists up to coordinates of 1~2.3 in the horizontal axis, and as can be seen in FIG. 9(c), in the second image, the cylinder exists between the coordinates of 2.2~3.5 in the horizontal axis. Since the convergence point has been adjusted to the hexahedron, there is no difference between the hexahedrons in the first image and the second image.

To easily understand disparity, referring to FIG. 9(d), in which the first and second images are shown in an overlapping manner, disparity of the cylinder is shown. Since the cylinder exists in front of the convergence point, a disparity value thereof is increased. If there is an object positioned behind the convergence point, a disparity value of the object may be increased.

After the disparity is calculated, the first image and the second image are synthesized by using the disparity (S150).

For example, a region in which a disparity value between the first image and the second image is the smallest is obtained from the first image, a region in which a disparity value is the greatest is obtained from the second image, a region in which a disparity value is median is obtained by synthesizing the first image and the second image. Thereafter, the regions are synthesized to complete a synthesized image.

In detail, it is assumed that a face of a person as a main subject is shown black due to backlight in a scene. Under the backlight conditions, the first mode may be set to a mode in which a scene is imaged brightly and the second mode may be set to a mode in which a scene is imaged darkly. Here, the first mode and the second mode may be automatically set or set by a user manipulation. In the case in which the first mode and the second mode are automatically set, an exposure meter sensor provided in the camera unit 121 may perform evaluative metering, partial metering, spot metering, and center weighted metering. In a case in which any one of the evaluative metering, partial metering, spot metering, and center weighted metering is performed to sense an environment in which a portion is dark and a portion is bright, the first mode or the second mode may be automatically performed. Under the backlight conditions, in a state in which the electronic device 100 is focused on a person's face, the electronic device 100 images a scene through the first optical lens in the first mode for capturing an image brightly, to obtain a first image, and images a scene through the second optical lens in the second mode for capturing an image darkly, to obtain a second image. The obtained first image may be an image in which it is impossible to recognize the person's face but overall brightness is normal (or proper), while the obtained second image may be an image in which the person's face is recognizable and overall brightness is balanced.

Thus, a region of the person's face in which the disparity value is the lowest may be obtained from the first image which has been captured brightly and a background portion of the scene which corresponds to a region in which the disparity value is the highest may be obtained from the second image which has been captured darkly, and synthesized to obtain an image in which the person's face is recognizable and the background is not too bright.

When the synthesizing is completed, the electronic device 100 may store one or more of the first image, the second image, and the synthesized image (S160).

Hereinafter, other examples of synthesizing first and second images will be described with reference to FIGS. 10 and 11.

Figure 10:
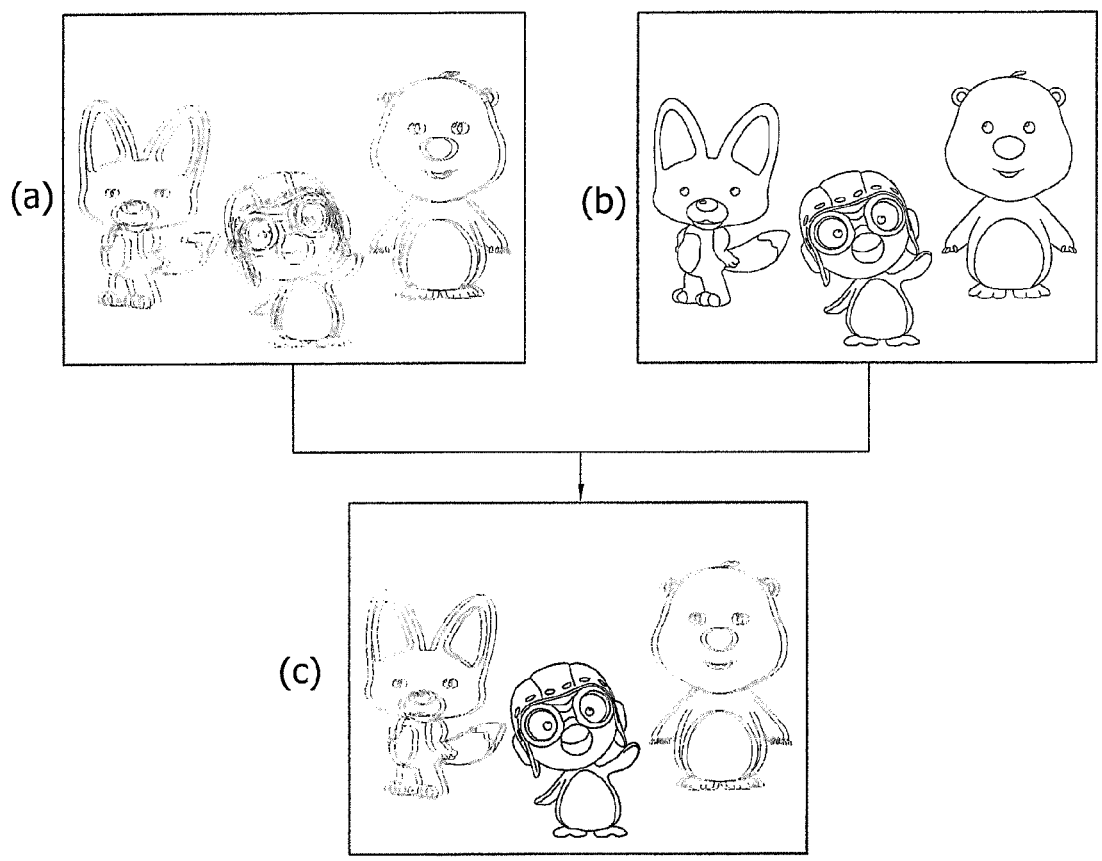
FIG. 10 includes views illustrating images captured according to the process illustrated in FIG. 5.
Figure 11:
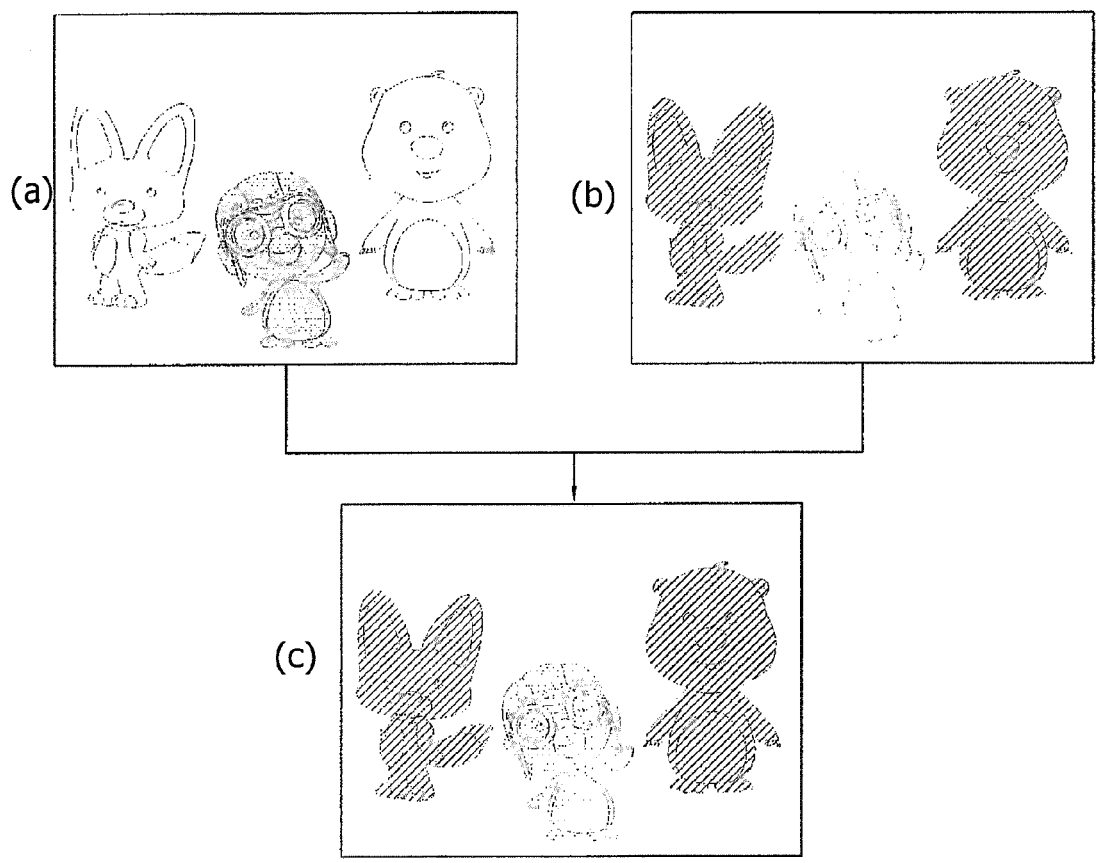
FIG. 11 includes other views illustrating images captured according to the process illustrated in FIG. 5.

FIGS. 10 and 11

FIG. 10 includes views illustrating images captured according to the process illustrated in FIG. 5, and FIG. 11 includes other views illustrating images captured according to the process illustrated in FIG. 5.

First, in an example of FIG. 10, a first mode is a mode for focusing on a main subject or an auxiliary subject, and a second mode is a mode for focusing on a main subject.

First, the main subject present in the middle of a scene is positioned at the forefront, and auxiliary subjects present in the left and right are positioned behind the main subject. Here, a convergence point is adjusted to the main subject.

The scene is captured in the first mode (namely, a mode in which the main subject is focusless as mentioned above) through the first optical lens to obtain a first image, and the scene is captured in the second mode (namely, a mode in which the main subject is focused) through the second optical lens to obtain a second image.

Here, the first image is an overall murky image in which the main subject or the auxiliary subjects are not focused (i.e., the main subject or the auxiliary subjects are focusless) as illustrated in FIG. 10(*a*), and the second image is an image in which the main subject is focused so as to be clearly shown as illustrated in FIG. 10(*b*).

A process of synthesizing the first image and the second image will be described. First, since a convergence point is adjusted to the main subject, a region in which a disparity value is the lowest is the main subject, a region in which a disparity value is the highest is a background of the scene, and a region in which a disparity value is median is the auxiliary subjects.

Thus, the main subject region is obtained from the second image in which the main subject is properly focused, a background portion of the scene corresponding to the region in which the disparity value is the highest is obtained from the first image, and regions of the first and second images in which the disparity value is median are synthesized to be obtained.

When the regions are synthesized, an image in which the main subject is focused and the other auxiliary subjects and the background are not focused so as be shown to be murky as illustrated in FIG. 10(*c*) may be obtained.

In this manner, an out-focusing effect may be obtained as a result. According to this example, although the first optical lens 121*a* and the second optical lens 121*b* is not a high-priced lens having a large degree of opening of an aperture, the first optical lens 121*a* and the second optical lens 121*b* may obtain an image having an out-focusing effect. In particular, in order to obtain the out-focusing effect, a degree of opening of an aperture needs to be equal to or less than 2.0, preferably, equal to or less than 1.8, but such a lens is costly and it is difficult to manufacture such a lens.

However, when image capturing is performed according to this example, through the two general optical lenses, an image having an out-focusing effect may be obtained at low costs.

Meanwhile, in an example illustrated in FIG. 11, the first mode is a mode for emphasizing a color of the main subject, and the second mode is a mode for emphasizing a color of the auxiliary subjects.

First, the main subject present in the middle of a scene is positioned at the forefront, and auxiliary subjects present in the left and right are positioned behind the main subject. Here, a convergence point is adjusted to the main subject. Also, it is assumed that the main subject mainly has a blue color and the auxiliary subjects mainly have a red color.

The scene is imaged in the first mode (in which the color of the main subject is emphasized as mentioned above) through the first optical lens to obtain a first image, and the scene is imaged in the second mode (in which the color of the auxiliary subjects is emphasized as mentioned above) through the second optical lens to obtain a second image.

Then, the first image is an image in which the blue color of the main subject is emphasized as illustrated in FIG. 11(*a*), and the second image is an image in which the red color is emphasized as illustrated in FIG. 11(*b*).

A process of synthesizing the first image and the second image will be described. First, since the convergence point is adjusted to the main subject, a region in which a disparity value is the smallest is the main subject, a region in which a disparity value is the largest is a background of the scene, and a region in which a disparity value is median is the auxiliary subjects.

Thus, the region of the main subject is obtained from the first image, the background part of the scene corresponding to the region in which the disparity value is the largest is obtained by synthesizing the first image and the second image, and the region in which the disparity value is median is obtained from the second image.

When the regions are synthesized, the image in which both the color of the main subject and the color of the auxiliary subjects are emphasized may be obtained.

In this example, a desired image may be obtained without having to use a high performance image processing chip set and an optical lens for expressing various colors.

Figure 12:
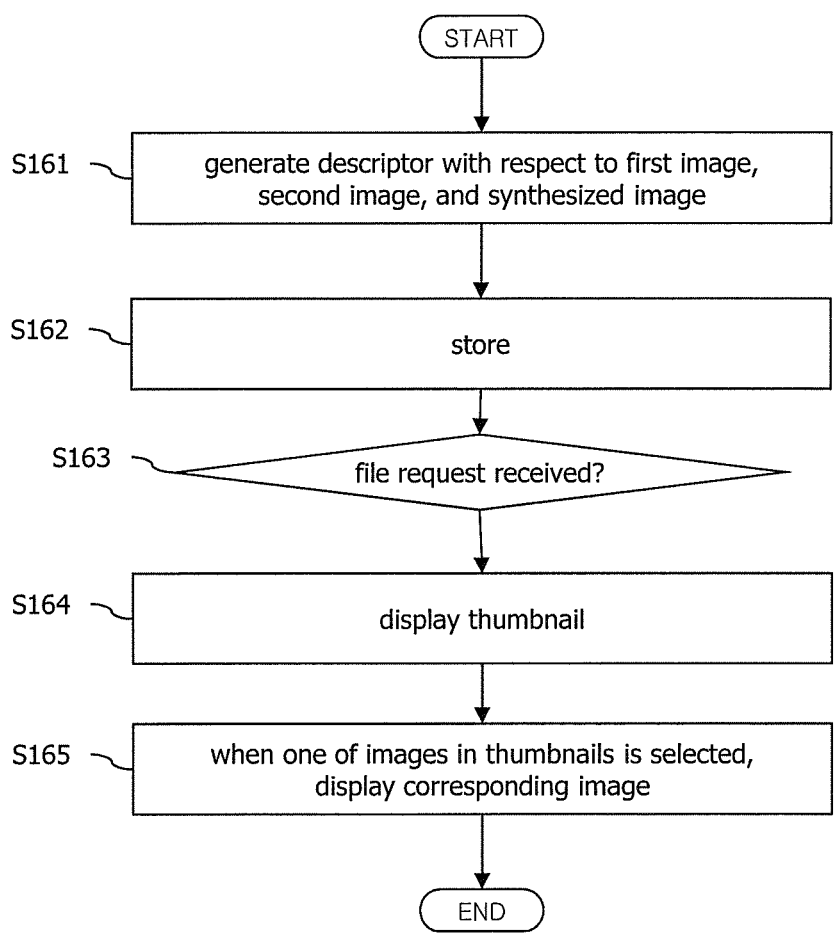
FIG. 12 is a flow chart specifically illustrating a storage process illustrated in FIG. 5.
Figure 13:
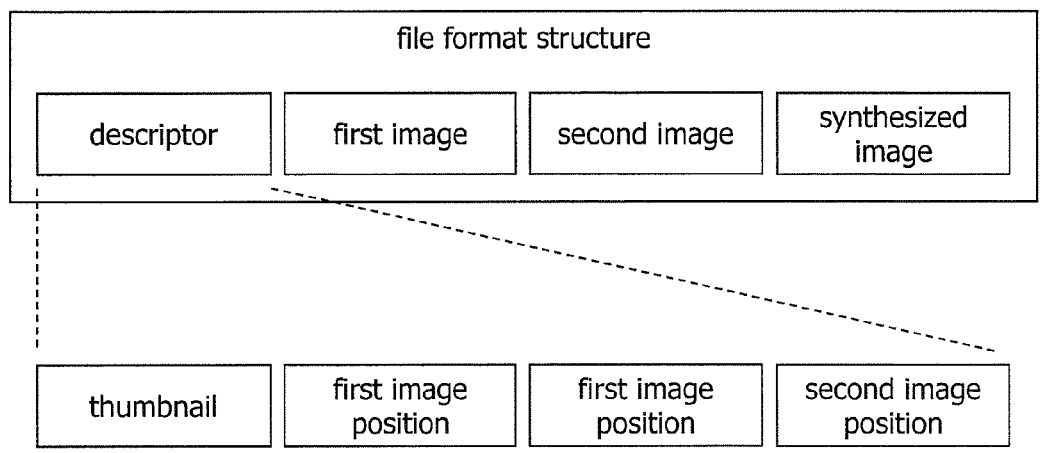
FIG. 13 is a view illustrating a format of a file stored according to the process illustrated in FIG. 12.

FIGS. 12 and 13

FIG. 12 is a flow chart specifically illustrating a storage process illustrated in FIG. 5, and FIG. 13 is a view illustrating a format of a file stored according to the process illustrated in FIG. 12.

As can be seen from FIG. 2, the process (S160) to store one or more of the first image, the second image, and the synthesized image is illustrated in detail.

First, the electronic device 100 generates a descriptor with respect to one or more of the first image, the second image, and the synthesized image (S161). As illustrated in FIG. 13, the descriptor includes a thumbnail, a first image position, a second image position, and a synthesized image position. The thumbnail may be a thumbnail with respect to the synthesized image. Also, the thumbnail may be a thumbnail with respect to each of the first image, the second image, and the synthesized image. Namely, the thumbnail may include a thumbnail with respect to the first image, a thumbnail with respect to the second image, and a thumbnail with respect to the synthesized image. The position may indicate where each image is positioned in the file format. For example, the position may be expressed by a start point and an offset. Alternatively, the position may be expressed by a start point and an end point.

When generation of the descriptor is completed (S161), the electronic device 100 stores the first image, the second image, and the synthesized image, together with the descriptor in a single file (S162).

Meanwhile, after the storing is completed, when a request for the file is received (S163), the electronic device 100 extracts a thumbnail from the descriptor of the file and displays the same (S164). Here, the displayed thumbnail may be a thumbnail with respect to the synthesized image as described above. Alternatively, the displayed thumbnail may be all of a thumbnail with respect to the first image, a thumbnail with respect to the second image, and a thumbnail with respect to the synthesized image.

After all of the thumbnail with respect to the first image, the thumbnail with respect to the second image, and the thumbnail with respect to the synthesized image are displayed, when an input selecting any one of them is received, the electronic device 100 may display the selected image (S165).

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein.

For software implementation, the embodiments such as procedures or functions described herein may be implemented by separate software modules. The software modules may be implemented by software codes written in any appropriate programming language. The software codes may be stored in a storage unit and executed by a processor.

FIG. 14

Figure 14:
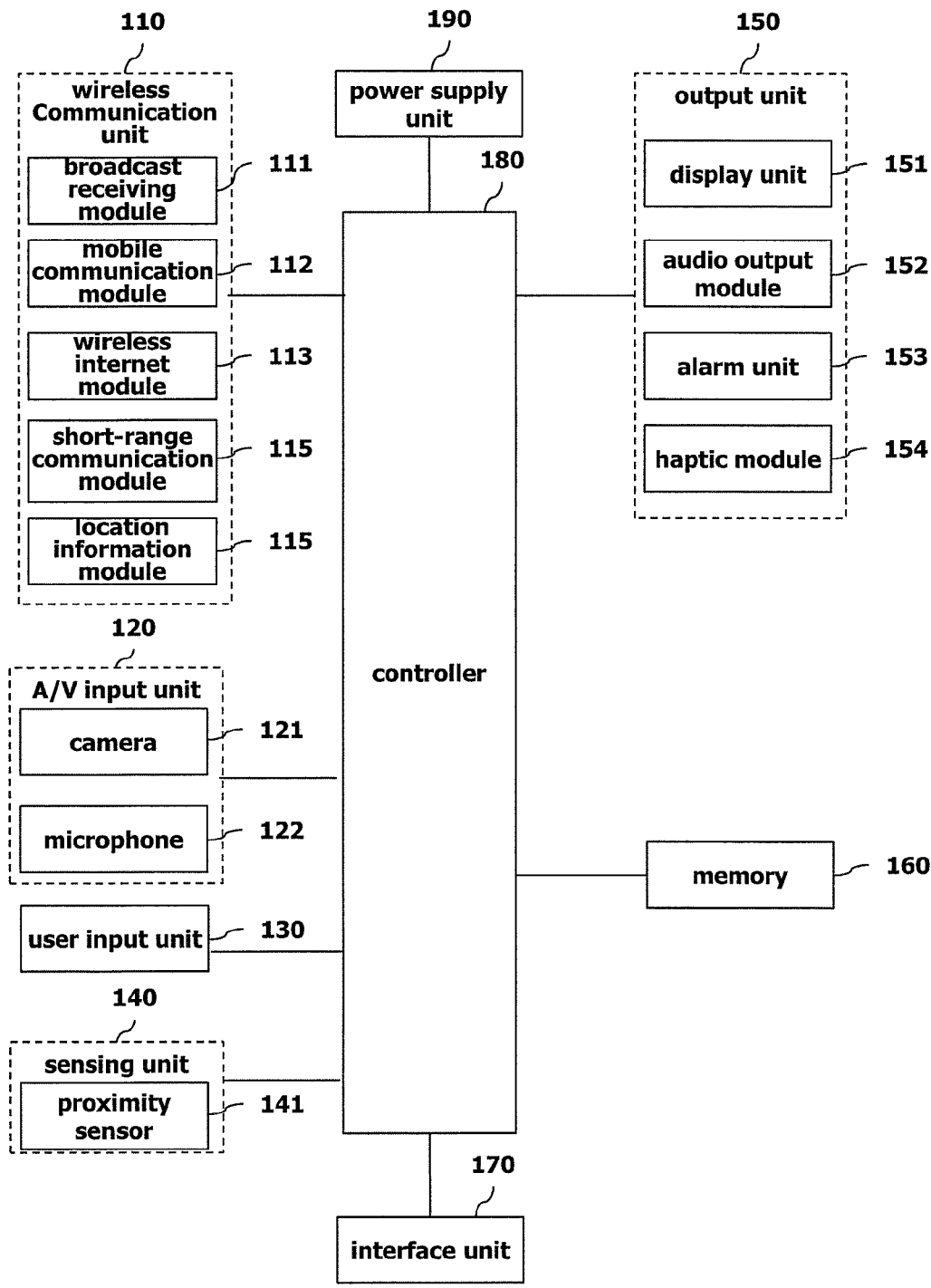
FIG. 14 is a block diagram illustrating a configuration when an electronic device according to an exemplary embodiment of the present disclosure is a mobile communication terminal.

FIG. 14 is a block diagram illustrating a configuration when an electronic device according to an exemplary embodiment of the present disclosure is a mobile communication terminal.

The mobile communication terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 14 are not essential, and the mobile communication terminal 100 may be implemented with greater or less number of elements than those illustrated elements.

Hereinafter, the foregoing constituent elements will be described in sequence.

The wireless communication unit 110 may include one or more modules allowing radio communication between the mobile communication terminal 100 and a wireless communication system, or allowing radio communication between the mobile communication terminal 100 and a network in which the mobile communication terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. The broadcast signal and/or broadcast associated information received through the broadcast receiving module 111 may be stored in the memory 160.

The mobile communication module 112 transmits and/or receives radio signals to and/or from at least one of a base station, an external terminal and a server. Such radio signals may include a voice call signal, a video call signal, or various types of data according to text and/or multimedia message transmission and/or reception.

The wireless Internet module 113 refers to a module supporting wireless Internet access for the mobile communication terminal. This module 113 may be internally or externally coupled to the mobile communication terminal 100. The wireless Internet access technique may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location of the mobile communication terminal 100. A typical example of the location information module is a GPS (Global Positioning System).

The camera unit 121 may include a first optical lens 121a and a second optical lens 121b. Also, the camera unit 121 may further include an exposure meter sensor as described above. An image frame processed by the camera unit 121 may be stored in the memory 160 or transmitted to the outside through the wireless communication unit 110.

The microphone 122 may receive an external audio signal in a call mode, a recording mode or speech recognition mode, and the microphone 122 may process the received audio signal into electric audio data. The processed audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 generates input data for controlling an operation of a terminal by a user. The user input unit 130 may include a keypad, a dome switch, a touch pad (resistive/capacitive), a jog wheel, a jog switch, and/or so on.

The sensing unit 140 may sense a current state of the mobile communication terminal 100, such as an open/close state of the mobile communication terminal 100, a position of the mobile communication terminal 100, whether a user touches the mobile communication terminal 100, a direction of the mobile communication terminal 100, and acceleration/deceleration of the mobile communication terminal 100, and the sensing unit 140 may generate a sensing signal for controlling an operation of the mobile communication terminal 100. For example, in a case in which the mobile communication terminal 100 is a slide phone, the sensing unit 140 may sense whether the slide phone is opened or closed. Further, the sensing unit 140 may sense whether the power supply unit 190 supplies power, whether the interface 170 is connected to an external device, and the like. The sensing unit 140 may include a proximity sensor 141.

The output unit 150 may generate visual, auditory and/or tactile output, and the output unit 150 may include a display unit 151, an audio output module 152, an alarm unit 153 and a haptic module 154.

The display unit 151 may display (output) information processed by the mobile communication terminal 100. In a case in which mobile communication terminal 100 is in a call mode, the display unit 151 may display a user interface (UI) and/or a graphic user interface (GUI) related to a telephone call. In a case in which the mobile communication terminal 100 is in a video telephony mode or an image capture mode, the display unit 151 may also display a captured and/or received image, a UI or a GUI.

The display unit 151 may include at least one of a liquid crystal display (LCD), a thin film transistor liquid crystal display (TFT LCD), an organic light-emitting display (OLED), a flexible display, a three-dimensional (3D) display, and an e-ink display.

Some of those displays may be configured with a transparent or light-transmissive type to allow for viewing of the exterior therethrough, which may be called transparent displays. An example of the typical transparent displays may include a transparent organic light emitting device (TOLED), and the like. Under this configuration, a user may view an object positioned at a rear side of a terminal body through a region occupied by the display unit 151 of the mobile communication terminal body.

Two or more display units 151 may be implemented according to a configured aspect of the mobile communication terminal 100. For instance, a plurality of the display units 151 may be arranged in one surface to be spaced apart from one another or integrated with each other, or may be arranged in different surfaces.

When the display unit 151 and a sensor sensing touch (hereinafter, referred to as a touch sensor) form a layered structure (hereinafter, referred to as a touch screen), the display unit 151 may be used as an input device as well as as an output device. The touch sensor may be in the form of a touch film, a touch sheet, and/or a touch pad, for example.

The touch sensor may be configured to convert a variation in pressure applied to a specific portion of the display 151 or a variation in capacitance generated at a specific portion of the display 151 into an electric input signal. The touch sensor may sense pressure of touch as well as position and area of the touch.

When a user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

Referring to FIG. 14, the proximity sensor 141 may be disposed near the display unit 151. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile communication terminal 100.

The proximity sensor 141 may include a transmission type photoelectric sensor, a direct reflective type photoelectric sensor, a mirror reflective type photoelectric sensor, a high-frequency oscillation proximity sensor, a capacitive proximity sensor, a magnetic proximity sensor, and/or an infrared proximity sensor. A capacitive touch screen may be configured such that proximity of a pointer is detected based on a change in an electric field according to the proximity of the pointer. In this case, the touch screen (touch sensor) may also be classified as a proximity sensor.

The audio output module 152 may output audio data received from the wireless communication unit 110 or stored in the memory 160 in a call signal receiving mode, a telephone call mode or a recording mode, a speech recognition mode, and a broadcasting receiving mode. The audio output module 152 may output audio signals related to functions (for example, a call signal incoming tone, a message incoming tone, and the like) performed in the mobile communication terminal 100. The audio output module 152 may include a receiver, a speaker, a buzzer, and/or the like.

The alarm unit 153 may output a signal for indicating generation of an event of the mobile communication terminal 100. For example, an alarm may be generated when receiving a call signal, receiving a message, inputting a key signal, and/or inputting a touch. The alarm unit 153 may also output signals in forms different from video signals or audio signals, for example, a signal for indicating generation of an event through vibration. The video signals and/or the audio signals may also be output through the display unit 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output. The display unit 151 and the audio output module 152 may also be classified as part of the alarm unit 153.

The haptic module 154 generates various tactile effects which a user can feel. A typical example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile communication terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile communication terminal 100 may operate in association with a web storage which performs the storage function of the memory 160 on the Internet.

The interface unit 170 may generally be implemented to interface the mobile communication terminal with external devices connected to the mobile communication terminal 100. The interface unit 170 may allow a data reception from an external device, a power delivery to each component in the mobile communication terminal 100, or a data transmission from the mobile communication terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile communication terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile communication terminal 100 via a port.

Furthermore, the interface unit 170 may serve as a path for power to be supplied from an external cradle to the mobile communication terminal 100 when the mobile communication terminal 100 is connected to the external cradle or as a path for transferring various command signals inputted from the cradle by a user to the mobile communication terminal 100. Such various command signals or power inputted from the cradle may operate as signals for recognizing that the mobile communication terminal 100 has accurately been mounted to the cradle.

The controller 180 typically controls the overall operations of the mobile communication terminal 100. For example, the controller 180 performs the control and processing associated with telephony calls, data communications, video calls, and the like.

The power supply unit 190 receives external and internal power to provide power required for various components under the control of the controller 180.

In the above, the configuration in the case in which the electronic device 100 is a mobile communication terminal has been described. Hereinafter, a configuration in which the electronic device 100 is a portable terminal will be described.

FIG. 15

Figure 15:
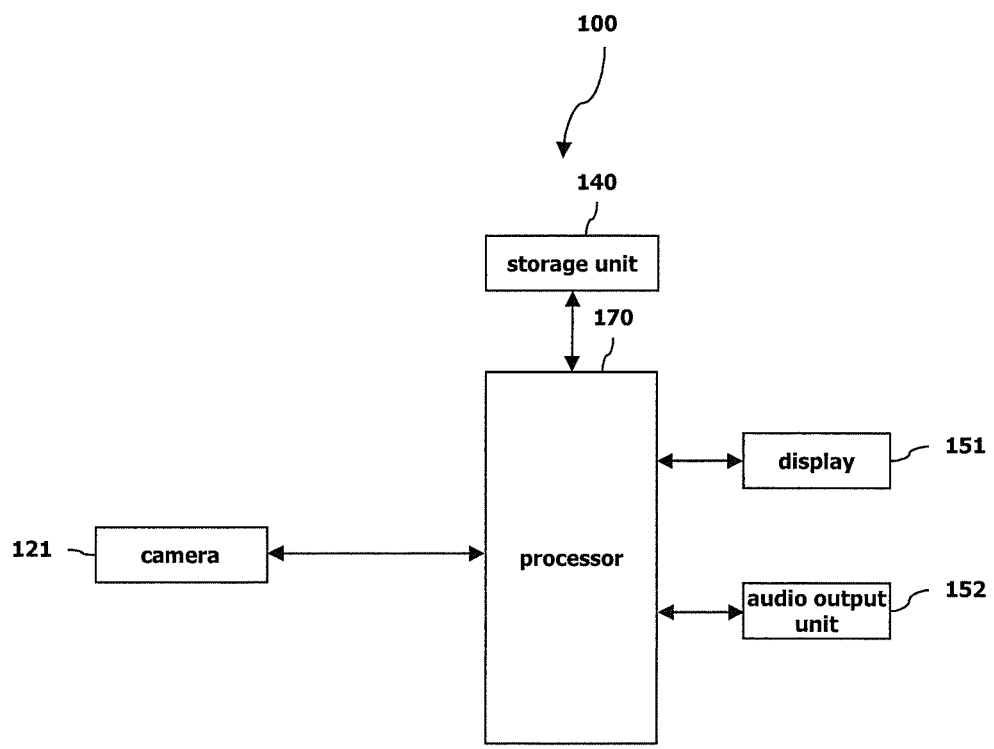
FIG. 15 is a block diagram illustrating a configuration when an electronic device according to an exemplary embodiment of the present disclosure is a portable terminal.

FIG. 15 is a block diagram illustrating a configuration when an electronic device according to an exemplary embodiment of the present disclosure is a portable terminal.

Referring to FIG. 15, a case in which a digital device 100 according to an exemplary embodiment of the present disclosure is a portable terminal, for example, a camera, a multimedia player, and a tablet terminal is illustrated.

The portable terminal may include a camera unit 121, a storage unit 140, a display 151, an audio output unit 152, and a processor 170. These components are the same as those illustrated in FIG. 14, so a repeated description thereof will be omitted and only operations thereof will be briefly described.

First, as mentioned above, the camera unit 121 may include a first optical lens 121a and a second optical lens 121b. Also, the camera unit 121 may further include an exposure meter sensor as described above.

The processor 170 may control the camera unit 121 to obtain a first image through the first optical lens 121a in a first mode, and also, the processor 170 may obtain a second image through the second optical lens 121b in a second mode simultaneously with or subsequently after the obtaining of the first image. The processor 170 may process the first image obtained in the first mode and the second image obtained in the second mode and store the same in the storage unit 140. Here, the first mode and the second mode may be different and may be changeable as described above.

The processor 170 may adjust a convergence point between the first optical lens 121a and the second optical lens 121b to a main subject in order to obtain the images. Namely, the processor 170 may adjust a disparity value between a main subject appearing in the first image and the main subject appearing in the second image such that it is minimized.

The first mode may be a mode in which the main subject is focused, and the second mode may be a mode in which the main subject is not focused. Also, the first mode may be a mode in which an image is captured to have a first color tone, and the second mode may be a mode in which an image is captured to have a second color tone. Also, the first mode may be a mode in which an image is captured by using a first effect, and the second mode may be a mode in which an image is captured by using a second effect. Also, the first mode may be a mode in which an image is captured with a first aperture value, and the second mode may be a mode in which an image is captured with a second aperture value. Also, the first mode may be a mode in which an image is captured with a first shutter speed value, and the second mode may be a mode in which an image is captured with a second shutter speed value. Also, the first mode may be a mode in which video is captured, and the second mode may be a mode in which a still image is captured.

Meanwhile, in a case in which the first image is an image in which the main subject is focused according to the first mode and the second image is an image in which the main subject is not focused according to the second mode, processing performed by the processor 170 may be synthesizing the first image and the second image in order to generate an image in which regions, excluding the main subject, are out-focused.

Meanwhile, the processor 170 may generate a disparity map between the first image and the second image. The processor 170 may obtain a region in which a disparity is the smallest, from the first image, a region in which a disparity is the largest, from the second image, and a region in which a disparity is median, by synthesizing the first image and the second image, according to the disparity map. The processor 170 may synthesize the obtained regions into a single image, and store the same.

Exemplary embodiments have been described but these embodiments have been presented by way of example only, and are not intended to limit the scope of the disclosures. Therefore, the present disclosure is not limited to the exemplary embodiments and is meant to cover all modifications, similarities and alternatives which are included in the spirit and scope of the present disclosure.

The invention claimed is:

1. A method for processing an image in an electronic device having a plurality of optical lenses, the method comprising:
   obtaining a first image through a first optical lens in a first mode;
   obtaining a second image through a second optical lens in a second mode simultaneously with or subsequently after the obtaining of the first image; and
   processing the first image obtained in the first mode and the second image obtained in the second mode and storing the same,
   wherein the first mode and the second mode are different and changeable.

2. The method of claim 1, further comprising:
   adjusting a convergence point between the first optical lens and the second optical lens to a main subject in obtaining the first image and the second image.

3. The method of claim 1, wherein, in obtaining the first image and the second image, the first image and the second image are obtained after a disparity value between a main subject appearing in the first image and a main subject appearing in the second image is minimized.

4. The method of claim 1, wherein the first image and the second image are related to the same object or scene.

5. The method of claim 1, wherein
   the first mode is a mode in which the main subject is focused and the second mode is a mode in which the main subject is not focused,
   the first mode is a mode in which an image is captured to have a first color tone and the second mode is a mode in which an image is captured to have a second color tone,
   the first mode is a mode in which an image is captured by using a first effect and the second mode is a mode in which an image is captured by using a second effect,
   the first mode is a mode in which an image is captured with a first aperture value and the second mode is a mode in which an image is captured with a second aperture value,
   the first mode is a mode in which an image is captured with a first shutter speed value and the second mode is a mode in which an image is captured with a second shutter speed value, and
   the first mode is a mode in which video is captured and the second mode is a mode in which a still image is captured.

6. The method of claim 1, wherein
   when the first image is an image in which a color of a person is emphasized according to the first mode and the second image is an image in which a color of a background is emphasized according to the second mode,
   the processing is synthesizing the first image with the second image to generate an image in which both the color of the person and the color of the background are emphasized.

7. The method of claim 1, wherein, in the storing,
   at least one of the first image, the second image, the image obtained by synthesizing the first and second images, and descriptors with respect to any one of the first image, the second image, and the synthesized image, is stored in a single file.

8. An electronic device comprising:
   a first optical lens;
   a second optical lens; and
   a processor configured to control the first optical lens and the second optical lens to obtain a first image in a first mode through the first optical lens and obtain a second image in a second mode through the second optical lens, process the first image and the second image, and store the same,
   wherein the first mode and the second mode are changeable.

9. The electronic device of claim 8, wherein the processor adjusts a convergence point between the first optical lens and the second optical lens to a main subject.

10. The electronic device of claim 8, wherein after the processor minimizes a disparity value between the main subject appearing in the first image and the main subject appearing in the second image, the processor obtains the first image and the second image.

11. The electronic device of claim 8, wherein
   the first mode is a mode in which the main subject is focused and the second mode is a mode in which the main subject is not focused,
   the first mode is a mode in which an image is captured to have a first color tone and the second mode is a mode in which an image is captured to have a second color tone,
   the first mode is a mode in which an image is captured by using a first effect and the second mode is a mode in which an image is captured by using a second effect,
   the first mode is a mode in which an image is captured with a first aperture value and the second mode is a mode in which an image is captured with a second aperture value,
   the first mode is a mode in which an image is captured with a first shutter speed value and the second mode is a mode in which an image is captured with a second shutter speed value, and
   the first mode is a mode in which video is captured and the second mode is a mode in which a still image is captured.

12. The electronic device of claim 8, wherein
   when the first image is an image in which a color of a person is emphasized according to the first mode and the second image is an image in which a color of a background is emphasized according to the second mode, the processing is synthesizing the first image with the second image to generate an image in which both the color of the person and the color of the background are emphasized.

13. The electronic device of claim 8, wherein the electronic device is a portable terminal, and the portable terminal includes one or more of a camera, a mobile communication terminal, a multimedia player, and a tablet terminal.

\* \* \* \* \*